United States Patent
Lemberg et al.

(10) Patent No.: US 8,731,513 B2
(45) Date of Patent: May 20, 2014

(54) SYSTEM AND METHOD FOR DELIVERING MOBILE WIRELESS BROADCAST MESSAGES IN DESIGNATED LANGUAGES

(75) Inventors: Vyacheslav Lemberg, Long Grove, IL (US); Sebastian Thalanany, Kildeer, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 13/458,416

(22) Filed: Apr. 27, 2012

(65) Prior Publication Data

US 2013/0288633 A1 Oct. 31, 2013

(51) Int. Cl.
*H04M 11/04* (2006.01)
(52) U.S. Cl.
USPC .................. 455/404.1; 455/412.1; 455/412.2; 455/414.2; 455/414.4; 704/2; 704/8; 704/203; 725/33; 725/34; 725/35; 725/36
(58) Field of Classification Search
CPC ........... H04W 4/22; H04W 4/12; H04W 4/14; H04W 8/18
USPC .......... 455/404.1, 412.1, 412.2, 414.2, 414.4; 725/33, 34, 35, 36; 704/2, 8, 203
See application file for complete search history.

(56) References Cited

U.S. PATENT DOCUMENTS

| | | | |
|---|---|---|---|
| 2003/0149557 A1* | 8/2003 | Cox et al. | 704/2 |
| 2011/0081884 A1* | 4/2011 | Sennett et al. | 455/404.2 |
| 2011/0307167 A1* | 12/2011 | Taschereau | 701/200 |
| 2012/0035908 A1* | 2/2012 | Lebeau et al. | 704/2 |
| 2012/0036529 A1* | 2/2012 | McClenny et al. | 725/33 |

* cited by examiner

*Primary Examiner* — Patrick Edouard
*Assistant Examiner* — Shantell L Heiber
(74) *Attorney, Agent, or Firm* — Leydig, Voit & Mayer, Ltd.

(57) ABSTRACT

A mobile wireless system and method are described for distributing emergency alert messages to mobile wireless devices in multiple languages. The emergency alert system receives an alert message including a geographic area identification, and a text alert. The emergency alert system renders one or more translations of the text alert from the text alert. The one or more translated versions of the text alert are provided in particular foreign languages based upon designated foreign languages corresponding to the geographic area identification. The emergency alert system transmits the text alert and one or more translated text alerts commercial mobile wireless service provider networks for broadcasting the text alert and the translated text alert(s) via mobile wireless transmitters having a coverage area falling within a region corresponding to the geographic area identification.

11 Claims, 5 Drawing Sheets

```
<?xml version = "1.0" encoding = "UTF-8"?>
<CMAS_Alert_Attributes xmlns = "urn:xxx:xxx:xx:xxx:cmac:1.0">
    <CMAC_protocol_version>1.0</CMAC_protocol_version>
    <CMAC_sending_gateway_id>http://cmas_alert_gateway.gov<CMAC_sending_gateway_id>
    <CMAC_message_number>00001056</CMAC_message_number>
    <CMAC_special_handling>Presidential</CMAC_special_handling>
    <CMAC_sender>w-nws.webmaster@noaa.gov</CMAC_sender>
    <CMAC_sent_date_time>2011-07-09T18:35:00-07:00</CMAC_sent_date_time>
    <CMAC_status>Actual</CMACstatus>
    <CMAC_message_type>Alert</CMAC_message_type>
    <CMAC_cap_alert_uri>http://cmas_alert_gateway.gov/CMAM1056</CMAC_cap_alert_uri>
    <CMAC_cap_identifier>White House Alert 2011-07-09T18:22:17-7:00</CMAC_cap_identifier>
    <CMAC_cap_sent_date_time>2011-07-09T18:22:17-07:00</CMAC_cap_sent_date_time>
    <CMAC_Alert_Info>
        <CMAC_category>Security</CMAC_category>
        <CMAC_severity>Extreme</CMAC_severity>
        <CMAC_event_code>EAN</CMAC_event_code>
        <CMAC_urgency>Expected</CMAC_urgency>
        <CMAC_certainty>Likely</CMAC_certainty>
        <CMAC_expires_date_time>2011-07-09T23:15:00</CMAC_expires_date_time>
        <CMAC_text_language>Spanish</CMAC_text_language>
        <CMAC_text_message_length>86</CMAC_text_message_length>
        <CMAC_text_alert_message>El Presidente ha emitido una alerta. Sintonice la radio o TV para obtener información.</CMAC_text_alert_message>
        <CMAC_Alert_Area>
            <CMAC_area_description>Dane County, Wisconsin</CMAC_area_description>
            <CMAC_cmas_geocode>55025 </CMAC_cmas_geocode>
        </CMAC_Alert_Area>
    </CMAC_Alert_Info>
</CMAC_Alert_Attributes>
```

SYSTEM AND METHOD FOR DELIVERING MOBILE WIRELESS BROADCAST MESSAGES IN DESIGNATED LANGUAGES

FIELD OF THE INVENTION

This invention relates generally to the field of mobile wireless communications networks. More particularly, the invention is directed to supporting broadcast mobile wireless data communication services in such networks, and more specifically to incorporating language translation servers into mobile wireless communications networks such that broadcast messages, such as emergency notifications, can be provided in a default language to particular wireless signal transmission and reception infrastructure (i.e., cell sites) within the mobile wireless networks.

BACKGROUND OF THE INVENTION

Mobile wireless systems today provided services going far beyond supporting voice communications. Modern mobile wireless services support a variety of voice and data services. With regard to data services, mobile wireless services support data sessions between data servers and smart mobile wireless devices running a variety of applications including: browsers, email, and text messaging. Several services have been developed to exploit the widespread adoption of data communications capabilities (e.g., text messaging as well as browsers) now incorporated into mobile wireless devices. A particular public service is the Commercial Mobile Alert System (CMAS)—also known as the Personal Localized Alerting Network (PLAN).

CMAS is an outgrowth of a broad initiative, the Integrated Public Alert and Warning System (IPAWS). IPAWS was established under an executive order to ensure that the American public promptly receives accurate alerts and warnings, regardless of communications technologies used to transmit the messages. The IPAWS infrastructure will include a mobile wireless alerting capability. Including mobile wireless alerts under the IPAWS system reflects the important role of mobile wireless technologies in disseminating alerts and warnings involving the public well-being. Providing critical alert information via mobile wireless devices enables the public to avoid danger or respond more quickly during crisis—potentially saving lives and preventing property damage. Through IPAWS, numerous public and private industry partners are working together to transform the current national alert and warning system to enable rapid dissemination of authenticated alert information over as many communications pathways as possible.

CMAS is a component of the IPAWS initiative having the goal of establishing an effective alerting network designed for disseminating emergency alerts, via wireless service providers, to mobile wireless devices such as cell phones. The Federal Communications Commission developed CMAS for incorporation into the wireless server provider networks. CMAS enables federal agencies to accept and aggregate alerts from the President of the United States, the National Weather Service (NWS) and emergency operations centers, and send the alerts to mobile wireless service providers. The mobile wireless service providers then broadcast the CMAS alerts to individual mobile wireless devices of subscribers via text (e.g., text messages). The types of alerts that are transmitted via CMAS include the following: alerts issued by the President, alerts relating to threats of physical harm (e.g., severe weather) and AMBER Alerts. CMAS relies upon the collaborative efforts of the Federal Emergency Management Agency (FEMA), the Department of Homeland Security Science and Technology Directorate (DHS S&T), the Alliance for Telecommunications Industry Solutions (ATIS), and the Telecommunications Industry Association (TIA).

CMAS is clearly one of the major components of the IPAWS. The CMAS component provides an interface to participating cellular mobile service providers for delivery of critical alert information to cellular phones in a danger zone. Specifically, the IPAWS CMAS capability will provide Federal, state, territorial, tribal and local government officials the ability to send 90 character, geographically targeted text alerts to the public, warning of imminent threats to life and property. An initial set of requirements of CMAS were developed by an advisory committee established by the FCC in accordance with the Warning, Alert and Response Network (WARN) Act of 2006.

A differentiator of the CMAS capability versus existing subscription-based text messaging alert services currently available in some localities is that the CMAS enables alert messages to be sent to mobile wireless devices within range of broadcasting cellular communications towers. The CMAS also utilizes communications channels and protocols in cellular systems that decrease the impact of network congestion on the ability of transmitters to transmit alert messages during times of emergency.

The IPAWS initiative led to establishing a specification for the interface between a federal alert aggregator/gateway and commercial service provider gateways. In November 2009, the Alliance for Telecommunication Industry Solutions/Telecommunications Industry Association (ATIS/TIA) Joint CMAS Working Group approved the "Joint ATIS/TIA CMAS Federal Alert Gateway to Commercial Mobile Service Providers (CMSP) Gateway Specification" (Specification). The Specification was adopted as the Government Interface Design Specification for the FEMA IPAWS federal alert aggregator/gateway on Dec. 7, 2009.

Thus, in summary the IPAWS initiative gave rise to CMAS. CMAS, in turn, is being established to ensure that emergency alerts and messages are quickly and efficiently disseminated to mobile wireless devices including at least text messaging capability. To that end, CMAS accepts messages from authorized federal, state, territorial, tribal, and local officials and distributes them to participating Commercial Mobile Service Providers (CMSP) for distribution to the public.

Regarding CMAS implementation in the diverse mobile wireless technologies, each cellular network technology (e.g., GSM, CDMA2000, LTE, etc.) has a well defined set of specifications for cell broadcast system. Each cell broadcast system includes an underlying technology for distributing emergency alerts. For example, the CMAS uses the diverse cell broadcast technologies of GSM, CDMA2000, and LTE networks to distribute emergency alerts originated from Federal, State, and Local Government Agencies in accordance with a well-defined emergency alert message interface.

Thus, well defined interface exists between the message sources and gateways established by the mobile wireless service providers for broadcasting emergency messages to end users. The present message dissemination architecture is set up for English-speaking end users.

SUMMARY OF THE INVENTION

Embodiments of the invention are used to provide a method, non-transitory computer readable medium, and computer system for disseminating emergency alert messages via mobile wireless networks in multiple languages. The method includes receiving an alert message including a geographic area identification, and a text alert. A translated text alert is rendered from the text alert. The translated text alert is provided in a foreign language based upon a designated foreign language corresponding to the geographic area identification. The text alert and translated text alert are thereafter transmitted to a mobile wireless service provider network for broadcasting the text alert and the translated text alert via mobile wireless transmitters having a coverage area falling within a region corresponding to the geographic area identification. The invention is also carried out in a system that is configured to carry out the above summarized operations and in a (non-transitory) computer-readable medium including computer-executable instructions. Such computer-executable instructions configuring processors on a networked system to carry out the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3 is an exemplary format for an XML document-based emergency message transmitted by a Federal Alert Gateway (via interface "C" in FIG. 2) to a Commercial Mobile Wireless Service Provider for distribution of an emergency broadcast message to mobile wireless device users in pertinent geographic locations in accordance with an embodiment of the invention;

DETAILED DESCRIPTION OF THE DRAWINGS

Exemplary embodiments of the invention described herein address a need to ensure that all persons having access to a mobile wireless device are given an understandable emergency alert message regardless of their primary spoken language. Such functionality is ensured by a system described herein that delivers emergency alert messages via broadcast to customers in both English and in at least a second language identified as a predominant language for each identified area where the emergency alert message is to be received by local users who do not speak English as their primary language.

Figure 1:
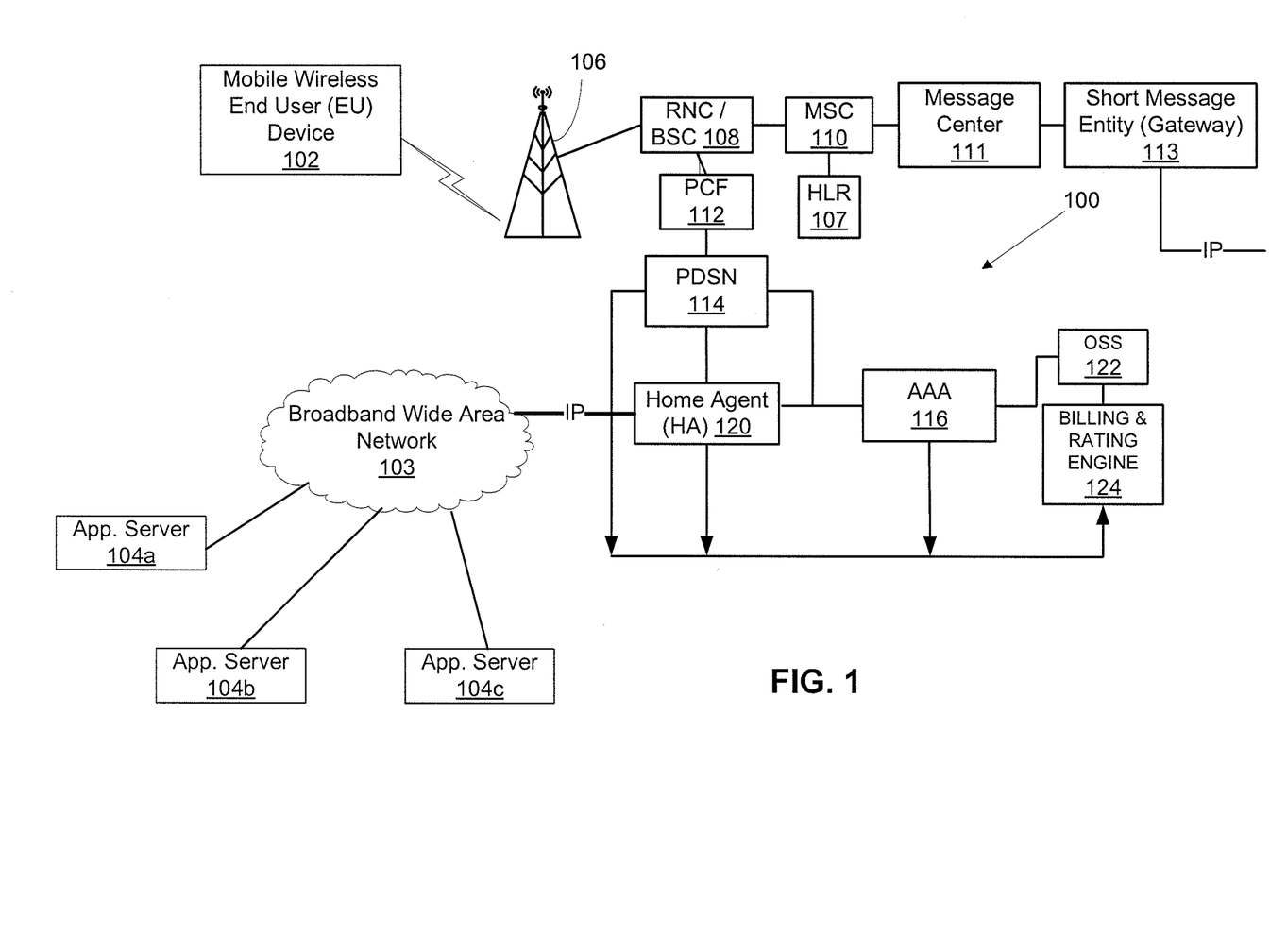
FIG. 1 is a schematic diagram illustrating a mobile wireless network environment interfacing a broadband digital data network to which a variety of application servers are coupled and are accessed by mobile wireless devices capable of performing data communications in accordance with an embodiment of the invention.

Turning to FIG. 1, a network environment is schematically depicted that includes a data interface between a mobile wireless network and a set of application server components as well as a link to a Federal Alert Gateway server facilitating the aforementioned emergency/alert message broadcast system and method described herein. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a mobile wireless device 102 depicted in FIG. 1 carrying out wireless communications via a base station 106 (also referred to as a base transceiver station or cell site). While only a single base station 106 is depicted in FIG. 1, the mobile wireless network system 100 includes hundreds of such stations per RNC/BSC 108 and, therefore, thousands of such stations per operator network. The scaling of base stations within the network continues to grow as smaller base station solutions continue to emerge through wireless innovation. (i.e., picocells, femtocells, hotspot solutions, etc).

The mobile wireless network system 100 provides mobile wireless data network services via the base station 106 to the mobile device 102. The mobile device 102 is any of a variety of devices including, for example: a mobile phone, a PDA, or a mobile computer (e.g., a laptop, notebook, notepad, tablet, etc.) having mobile wireless data communication capability.

The mobile wireless system 100 includes a plurality of base stations, such as the base station 106. The base station 106, by way of example, includes radio bearer resources and other transmission equipment necessary for wireless communication of information between the mobile device 102 and other network elements. The base station 106 includes one or more transceiver-antenna combinations. More generally, there is no intention to limit the invention to the exemplary environment schematically depicted in FIG. 1 since the described emergency message broadcast system applies to other types of wireless communications systems including, without limitation, 3GPP2, EVD0 and LTE based mobile wireless network systems.

The mobile wireless network system 100 is, in turn, connected to a broadband wide area network 103. The broadband network 103 provides digital data connectivity to a variety of application servers 104a, 104b, and 104c. The application servers 104a, 104b, and 104c are representative of millions of application server systems (both in-service operator network servers and out-of-operator network servers) providing a variety of Web-based services via the Internet.

Turning attention to particular components of the mobile wireless system 100, a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the base station 106 within the system 100 is carried out, for example, by a radio network controller (RNC) or a base station controller (BSC), identified in FIG. 1 as RNC/BSC 108. The RNC/BSC 108 manages the radio traffic between neighboring ones of a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100. In accordance with an exemplary embodiment, the MSC 110 is also connected to a message center 111. The message center 111 is a messaging component of the illustrative mobile wireless system 100 configured to store and forward alert messages issued by a federal alert messaging system. The message center 111 receives transmitted from a short message entity (SME) 113 that operates as a gateway between the mobile wireless system 100 and the federal alert messaging system described herein with reference to FIG. 2. The message center 111 receives an alert message transmitted (point-to-point) by the SME 113 to one or more message centers. The message center 111 transmits the received alert message to one or more connected MSCs, such as the MSC 110, in accordance with a geographic identifier specifying an area to which the alert message applies. The MSC 110 selectively transmits (based upon a geographic location designation) received alert messages to particular base stations, such as the one for the RNC/BSC 108.

The SME 113 is a gateway subsystem of the mobile wireless system 100 that operates as the interface to the federal alert messaging system. While only a single SME 113 is depicted in FIG. 1, a typical mobile wireless system (such as system 100) includes at least two SMEs—one of the two being an alternate SME—having two distinct Internet addresses through which alert messages can be received (via the Internet) from any one of multiple federal alert message sources. Each commercial wireless provider system, such as the mobile wireless 100, provides its own SME as the (redundant/alternately specified) point of entry for alert messages to the commercial mobile wireless systems. Alternatively, additional SMEs are provided (in a load sharing/balancing configuration/arrangement) to enhance throughput in a scalable arrangement for handling systems with large numbers of message centers (e.g. MC 111).

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine permissions for users associated with the account with which the mobile device 102 is associated.

In accordance with an exemplary embodiment, the mobile wireless system 100 further includes a billing and rating engine 124. As indicated in FIG. 1, the billing and rating engine 124 is a back office system that is configured to receive certain information, based upon subscriber usage information received from other components of the system 100. The billing and rating engine 124 communicates such information to the OSS 122. By way of example, the billing and rating engine 124 monitors information provided by the HA 120 indicating a particular mode within which the mobile device 102 is (or has been) operating—as well as the quantity of data passed by the mobile device 102 while operating in the indicated mode. The billing and rating engine 124 issues a notification to the OSS 122 that the mobile device 102 is (or has been) operating in a particular mode. The indicated particular operational mode of operation sent to the OSS 122, if not permitted under the current user profile for the mobile device 102, initiates immediate and/or delayed responsive actions by the mobile wireless system 100 to ensure that the mobile device 102 operates in accordance with the terms of a current user agreement.

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Figure 2:
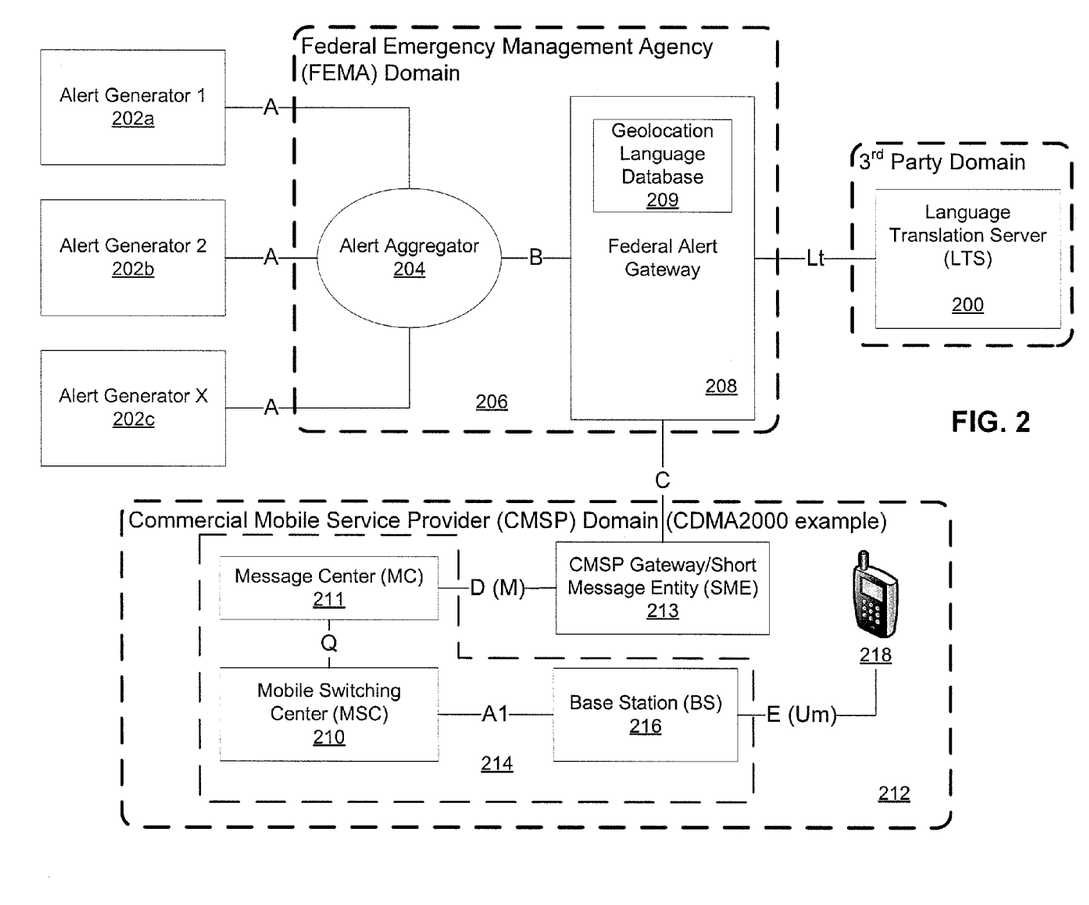
FIG. 2 is an exemplary diagram depicting an emergency broadcast message distribution infrastructure in accordance with an exemplary embodiment.

Turning to FIG. 2, as exemplary network architecture is schematically depicted that includes a location translation server (LTS) 200 within a CMAS. The LTS 200 provides the aforementioned multiple language functionality for broadcast emergency messages. The LTS 200 includes at least a language translator service that converts English text into any of a set of supported foreign languages specified in a translation request.

The exemplary network includes alert generators 202a, 202b, and 202b. The alert generators 202a, 202b, and 202c represent, by way of example, represent Federal, state, local and tribal agencies that are the originators of emergency broadcast messages distributed to mobile wireless device users in multiple languages. The set of multiple languages contained in broadcast emergency messages transmitted from a particular cell site are determined by census data and the geographic location of the cell site from which the emergency message is ultimately broadcast.

With continued reference to FIG. 2, an alert aggregator 204 of an alerting framework 206 receives the messages originating from the alert generators 202a, 202b and 202c via Interface A. Interface A incorporates an XML-based Common Alerting Protocol as specified in ITU-T Recommendation X.1303 (an existing protocol used for submitting emergency alerts). The alerting framework 206 is operated, for example, by an authorized government entity (e.g., FEMA). The alerting framework 206 is, in general, a server (or cluster of servers) that aggregate incoming alert messages from the alert generators 202a, 202b and 202c, and deliver the received alert messages to an alert gateway 208 via Interface B. Interface B also incorporates the XML-based Common Alerting Protocol as specified in ITU-T Recommendation X.1303.

The alert gateway 208 is a server system that is typically administered by a government entity such as FEMA. The alert gateway 208 packages raw alert messages provided by the alert aggregator 204. The alert gateway 208 communicates with the language translation server 200 via Interface Lt (language translation). Interface Lt incorporates an HTTP-based protocol as defined by RFC 2616. In an exemplary embodiment (e.g., Commercial Mobile Alert for C (CMAC)—interface), the alert gateway 208 maintains a geographic language mapping (geolocation language) database 209. The database 209 includes one or more tables that map values of geographic area (e.g., CMAC_polygon, CMAC_circle, CMAC_cmas_geocode, CMAC_cap_geocode, or CMAC_gnis, etc.) to a set of CMAC_text_language values. The set of CMAC_text_language values identify a set of languages spoken in the indicated geographic area. The pre-configuration of the database 209 is performed, for example, automatically based upon latest Census Bureau language demographic information. By way of example, each geographic area table entry in the database 209 is identified by a CMAC_cmas_geocode. The CMAC_cmas_geocode is a five character string, wherein the first two characters or digits identify the state or region, and the last three digits identify a specific county, region or equivalent entity. A list of predominant foreign languages is identified for each CMAC_cmas_geocode entry in the database 209.

The alert gateway 208 transmits packaged (formatted and augmented with translated text messages in accordance with exemplary embodiments of the invention) alert messages to commercial mobile wireless service providers including commercial mobile wireless service provider network 212. In the illustrative example, the alert gateway 208 transmits the packaged alert messages via Interface C to a commercial mobile wireless service provider gateway—e.g., a short message entity (SME) 213. Interface C is, for example, a point-to-point communication interface that incorporates an XML based protocol developed for handling interactions between an Alert Gateway and CMSP Gateway. Interface C is presently being standardized by a joint CMAS specification document (J-STD-101) by members of the TIA and the ATIS standards organizations.

In an illustrative embodiment, the SME 213 is a specialized application server (see e.g., application servers 104a, 104b and 104c in FIG. 1). The SME 213 is administered by a commercial mobile wireless service provider. The SME 213 carries out a store and forward functionality between multiple federal alert message sources, e.g. the alert gateway 208, and a set of message centers (MC) maintained by the CMSP network 212—including a message center (MC) 211. The MC 211, in turn, forwards received alert messages to particular mobile switching centers (MSCs.) such as a mobile switching center 210 based upon a geographic location designated in the received alert message. The SME 213 transmits received packaged alert messages to a commercial mobile wireless service provider infrastructure 214 via Interface D. Interface D(M), in the CDMA2000 example for the infrastructure 214, incorporates a broadcast variant of the SMDPP protocol (SS7) TIA/EIA/IS-824. In the context of a CDMA2000 network, such interface is referred to as "M." The transmission mode and format of the alert messages transmitted via Interface D is mobile wireless network technology-dependent. Thus, the SME 213 facilitates supporting a variety of mobile wireless network technologies (generations) while maintaining a common definition for messages transmitted via Interface C. It is further noted that the SME 213, by way of example, prepares the actual message content (ultimately received by a mobile wireless device 218) according to the TIA-1149-1 specification.

It is noted that the example in FIG. 2 is simplified to aid understanding the message flow. The SME 213 in a specific service provider network can receive alert messages from multiple alert gateways, such as the alert gateway 208, in the network. In an illustrative example, mobile wireless service providers provide a primary and an alternate Internet Protocol address for the SME 213 identified to receive alert messages from potentially many alert gateways. The SME 213 provides a single (redundantly configured) point of entry for alerts into the commercial mobile wireless service provider network 212. If additional (load distributing) service provider gateways are deployed to support a regional architecture or to handle anticipated traffic, distribution of alert messages among all the multiple service provider gateways is determined by the service provider network 212 (i.e., is transparent to alert gateway 208).

In the illustrative example wherein the infrastructure 214 implements CDMA2000, the message center 211 receives alert messages addressed to it (based upon geographic area) and forwards the received messages to one or more appropriate message switching centers, such as an MSC 210 via Interface Q. Interface Q, between the MC 211 and the MSC 210 is, by way of example (in this case a CDMA2000 infrastructure example), a variant of the SMDPP protocol (SS7) of TIA/EIA/IS-824. It is further noted that prior to issuing the previously generated alert message to the MSC 210, the MC 211 encapsulates the message (previously encapsulated in a wrapper created by the SME 213) for the mobile wireless device 218 in a wrapper prepared in accordance with TIA/EIA-637 and TIA/EIA/TSB58 specifications.

The MSC 210, in turn, routes the alert messages to particular ones of associated base stations, such as base station 216 via interface A1. The A1 interface carries signaling information between the call control (CC) and mobility management (MM) functions of the MSC 210 and the CC component of the BS 216. The A1 interface is based upon TIA/EIA/IS-2001. The BS 216, in turn, broadcasts the received alert message to all mobile devices (e.g., mobile wireless device 218) within range of a cell tower (antennas) via Interface E(Um). Interface E(Um) is a CDMA2000 air interface based on TIA/EIA/IS-2000 specifications. Examples of the mobile wireless device 218 include a variety of device types having mobile wireless communications capabilities including, for example cell phones, smart phones, tablet computers, notebook computers, etc. In general, Interface E (between a base station and mobile wireless devices) is service provider network and wireless network technology dependent. For example, for GSM networks Interface E is based on 3GPP TS 44.012. For CDMA networks, as noted above, Interface E is based on TIA/EIA/IS-2000. For LTE networks, Interface E is based on 3GPP TS 36.331.

The network schematically depicted in FIG. 2 is exemplary in nature. While FIG. 2 depicts the SME 213 as a separate entity, in alternative embodiments, the SME 213 functionality is carried out by a more tightly integrated server within the commercial mobile wireless service provider infrastructure 214. Thus, the separate identification of the SME 213 and the service provider infrastructure 214 is a logical separation—which services are provided by a single physical server or multiple physical server systems. Furthermore, while a single Interface C is identified in FIG. 2, in practice the alert gateway 208 communicates with multiple mobile wireless service provider networks, such as the service provider network 212, via multiple instances of the Interface C. Similarly, the SME 213 communicates with potentially many sources of alerts via Interface C (not just the single point-to-point connection to alert gateway 208).

Turning to FIG. 3, an exemplary message structure is provided for an XML document-based emergency alert message transmitted by a Federal Alert Gateway (via interface "C" in FIG. 2) to a Commercial Mobile Wireless Service Provider for distribution of an emergency broadcast message to mobile wireless device users in pertinent geographic locations within a mobile wireless network. The illustrative example is a Presidential Alert provided in Spanish to residents of Dane County, Wis.

The following is a brief summary of the fields (e.g., tagged elements), specified in accordance with J-STD-101, in the exemplary message format.

An xml version tag identifies a particular xml schema/version specification under which the provided message was formed.

A CMAS_Alert_Attributes xmlns tag identifies the beginning of the alert message attributes. The xmlns attribute is included, in the form of a uniform resource name (URN), referencing the CMAC namespace a resource by a combination of namespace identifier and namespace-specific string.

A CMAC_protocol_version tag identified the CMAC protocol version under which the message structure was created.

A CMAC_sending_gateway_id tag identifies the CMAC gateway (e.g., gateway 208) that issued the alert message.

A CMAC_message_number tag identifies a number assigned to the message.

A CMAC_special_handling tag includes a string corresponding to a special handling condition. The value indicates that the message requires special handling. Current special handling codes include: Presidential, Child Abduction and Required Monthly Test.

A CMAC_sender tag includes a string identifying the source of the alert (e.g., Alert Generator 1 202a.

A CMAC_sent_date_time tag specifies a date and time at which the alert was issued by the gateway 208 to the SME 213.

A CMAC_status tag distinguishes alert messages from messages used for internal system use only. Potential values include "actual" and "system."

A CMAC_message_type tag specifies the type of message being transmitted (in this case it is an "alert" message).

A CMAC_cap_alert_uri tag specifies the URI where the SME 213 can retrieve the complete CAP version of an alert message corresponding to a received alert from the gateway 208.

A CMAC_cap_identifier tag specifies the identifier field of the CAP message used by the SME 213 to validate the corresponding CAP message.

A CMAC_cap_sent_date_time tag specifies a data and time at which the alert was received by the gateway 208.

A CMAC_Alert_Info tag specifies the beginning of a group of attributes describing the substance of the message. Exemplary attribute tags are listed herein below.

A CMAC_category tag specifies one of multiple pre-defined categories for the alert (e.g., a "security" alert). The category provides an indication of the type of event that led to issuance of the alert.

A CMAC_severity tag specifies one of multiple pre-defined levels of severity of the event that led to the alert text message issuing.

A CMAC_urgency tag specifies one of multiple pre-defined levels of urgency indicating when the event that led to the alert is expected to impact the recipients of the alert message.

A CMAC_certainty tag specifies one of multiple pre-defined levels of likelihood that recipients will be impacted by the event that resulted in the alert text message.

A CMAC_expires_date_time tag specifies when the alert will no longer be applicable to the recipients of the alert text message.

A CMAC_text_language tag specifies the language (e.g., Spanish) in which the alert message is provided to users.

A CMAC_text_message_length tag specifies the number of characters in the text alert message.

A CMAC_text_alert message tag specifies the actual text that will ultimately be displayed upon mobile wireless devices that receive the alert message issued from the gateway 208 to the SME 213 via interface C.

A CMAC_Alert_Area tag specifies the beginning of a group of tags describing a region to which the issued alert message applies. The Alert area is described, for example by the following further tags provided below.

A CMAC_area_description tag specifies, in text string form, the area to which the alert message is to be broadcast (e.g., Dane County, Wis.).

A CMAC_cmas_geocode tag specifies a 5-digit geocode corresponding to the text string specified by the area_description tag.

FIG. 3 provides an illustrative example of a set of tags for an exemplary XML-based alert message transmitted via Interface C between the gateway 208 and the SME 213. However, there are many alternative structures for specifying messages containing alert text provided in various languages based upon knowledge of languages spoken by a population within an area to which the text alert message is to be broadcast.

Figure 4:
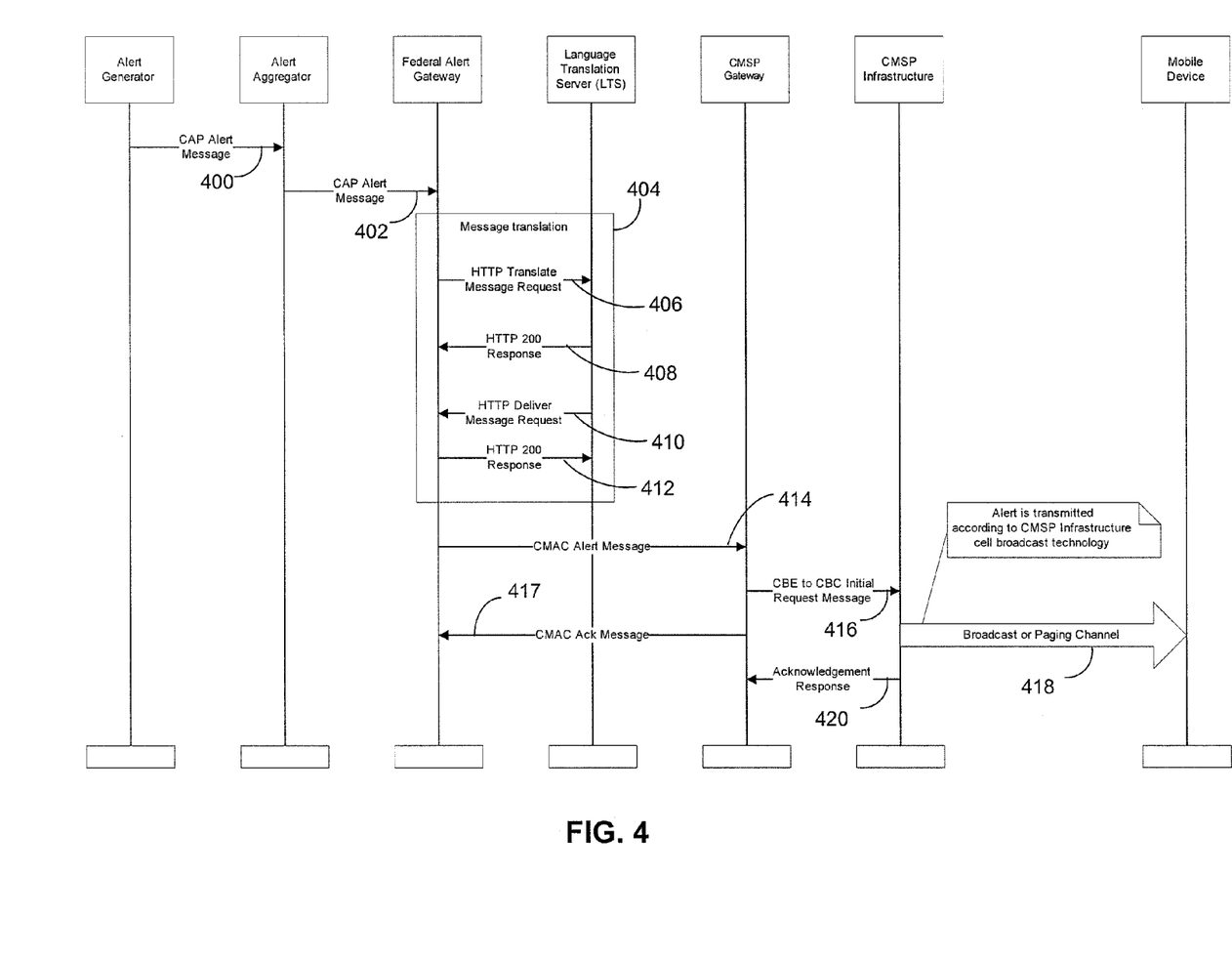
FIG. 4 is a sequence diagram summarizing a set of messaging stages/steps for implementing transmitting alert messages in accordance with geographic translation needs indicated by a geographic language mapping database in accordance with an embodiment of the invention.

Turning to FIG. 4, a flowchart provides a summary of steps/stages depicting the message flow from an alert generator to a mobile device. The message flow includes the aforementioned intermediate stage where the English language text contained in an alert message received by the alert gateway 208 is translated into one or more foreign languages by the LTS 200 prior to transmission by the alert gateway 208 to the commercial mobile wireless service provider network 212. The alert message translation aspect of the message flow is provided, by way of a detailed example, in FIG. 5. Initially, during stage 400, an alert message is transmitted via Interface A from an alert generator (e.g., alert generator 202a) to the alert aggregator 204. During stage 402, the alert aggregator 204 transmits the alert message (without modification) to the alert gateway 208 via Interface B.

Thereafter, during stage 404 the alert gateway carries out alert message translation via a request/response sequence with the LTS 200 based upon geographic-specific language translation needs identified in the geographic language mapping database 209 (for an effected area). During step 406 of stage 204, the alert gateway submits an alert message including the following: (1) alert text and (2) list of languages. The LTS 200 returns an immediate acknowledgement during step 408 and proceeds to perform the requested translations. Thereafter, during step 410, the LTS 200 provides the set of translations corresponding to the alert gateway 208 request. The alert gateway 208, during step 412, acknowledges the receipt of the translations from the LTS 200.

Having received all necessary translations for the alert message received during stage 402, during stage 414 the alert gateway 208 transmits alert messages to the commercial mobile wireless service provider gateways, including the SME 213, during stage 414. The alert gateway 208 includes the CMAC_text_language element in the alert message to the SME 213 to specify the language of the text in the CMAC_text_alert message element. This aspect of the message flow is described in detail herein below with reference to FIG. 5. The SME 213, during stage 416, transmits the received alert messages to the service provider infrastructure 214. During step 417, the SME 213 issues an acknowledgement of receipt of the alert gateway 208's request.

During stage 418, the commercial mobile wireless service provider infrastructure 214 broadcasts the received alert messages to all cell sites within the network 212 which most closely align to the indicated alert area. As demonstrated above with reference to FIG. 3, the J-STD-101 specification contains CMAC message elements indicating an affected area of the alert message. Upon completion of the broadcast to the affected cell sites, during stage 420 the service provider infrastructure 214 transmits an acknowledge message to the SME 213.

Figure 5:
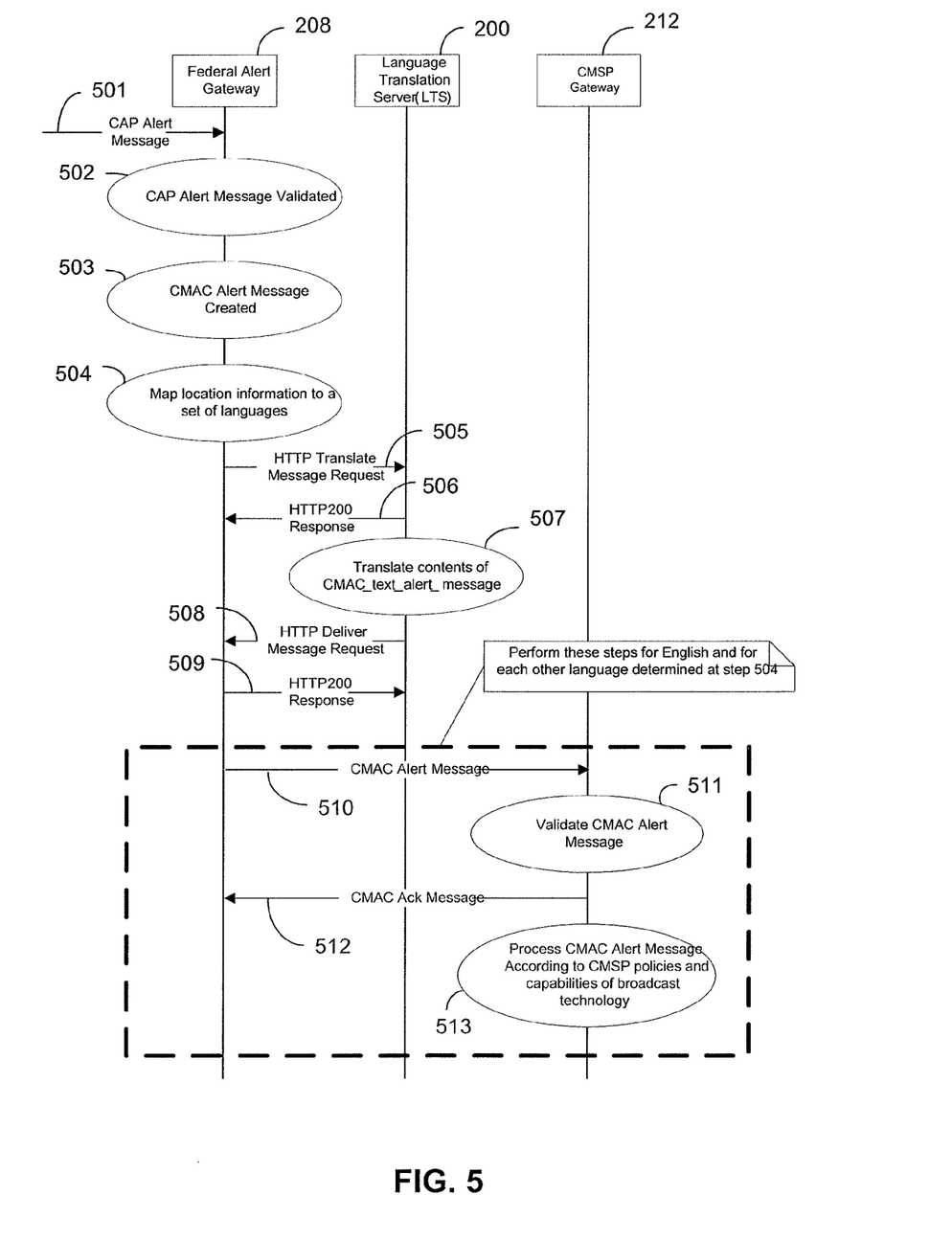
FIG. 5 is a sequence diagram summarizing a set of messaging stages/steps for a detailed example of the translation determination and broadcasting translated messages aspects of the message flow described in FIG. 4.

Turning to FIG. 5, a sequence diagram summarizes a set of stages indicating message flow in accordance with an exemplary embodiment.

During step 501, a Common Alerting Protocol (CAP) alert message is received by the alert gateway 208. During step 502, the alert gateway 208 validates the received CAP Alert message to ensure its authenticity. Thereafter, during step 503 the alert gateway 208 constructs a CMAC alert message using attributes from the received CAP alert message. The CMAC alert message contains a set of data elements including, by way of example, the following: CMAC_cmas_geocode, CMAC_text_language, and CMAC_text_alert_message.

Thereafter, during step 504 the alert gateway 208 determines, based on the CMAC_cmas_geocode element, the top N languages, besides English, spoken in the affected alert area. The alert gateway uses internal data structures, maintained by the geographic language mapping database 209 that map geo-location to a set of languages. As noted above, the entries of the database 209 are created based on the latest information from the U.S. Census Bureau. For example, if the CMAC_cmas_geocode is 23003 (corresponding to Aroostook County, Me.), then the top 3 languages spoken are French, Spanish, and German.

Next, during step 505, the alert gateway 208 constructs and sends an HTTP Request message to the LTS 200 including components indicating the message to translate and the set of languages to be used in the translation. During step 506, LTS 200 acknowledges receipt of the translation request from the alert gateway 208 (e.g., a "200 OK" response). During step 507, the LTS 200 generates translations of the indicated alert message into each of the identified foreign languages. Thereafter, the LTS 200 constructs and sends, by way of example, an HTTP request message (due to synchronous messaging) to the alert gateway 208 containing an instance of CMAC_text_alert_message translated into the previously identified foreign languages. For example, the request message from the LTS 200 contains three translated text components: one for French, one for Spanish, and one for German. During step 509, the alert gateway 208 acknowledges receipt of the LTS 200's request with an acknowledgement response (e.g., 200 OK).

Stage 520, comprising steps (message flows) 510, 511, 512, 513 are performed multiple times, once for English and each translated language specified during step 504. During step 510, the alert gateway 208 issues a CMAC Alert Message to the SME 213 via Interface C. The message contains, in the first instance, an alert message with the "CMAC_text_language" set to English with the original English-based alert text (e.g., CMAC_text_alert_message). During step 511, the SME 213 validates the received CMAC Alert Message to ensure the received alert's authenticity. During step 512, the SME 213 issues a text alert message acknowledgement (ACK) message to the alert gateway 208 via Interface C. Thereafter, the received text alert message is broadcast within the service provider network 212 according to the policy of the mobile wireless service provider network 212 and according to the capabilities of various mobile wireless technologies supported by the service provider network 212.

As noted previously, steps 510, 511, 512 and 513 are repeated (during stage 520) for each language specified/determined during step 504. For example, if Spanish and French are identified during step 504, then steps 510, 511, 512 and 513 are repeated for each of these two languages during stage 520.

In embodiments of the above-described alert message distribution arrangement, the mobile device 218 will receive multiple copies of a broadcast alert message (based upon the designated translations for the specified geographic area). To ensure a user of the mobile device 218 receives prompt notification of an alert message in a preferred language, the mobile device 218 operating system is enhanced to support designating a default language for received alert messages. Thereafter, the mobile device 218 prioritizes display of an alert message (when multiple translated versions have been received of an alert message) according to the specified default language. In yet another embodiment, the configuration interface supports designating a prioritized list of languages. Thus, if a first choice is not available, but a less preferred translation is available, then the less preferred translation is presented by the mobile device 218.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for broadcasting public warning messages for presentation to mobile wireless device users in multiple languages, the method comprising the steps:
   receiving, by an alerting framework, an alert message including:
      a geographic area identification, and
      a text alert;
   rendering, by the alerting framework, a set of translated text alerts for the text alert, the set of translated text alerts being in a set of foreign languages based upon designated foreign languages corresponding to the geographic area identification, wherein the set of foreign languages is determined by reference to a database listing predominant foreign languages identified for each geocode;
   issuing, by the alerting framework, alert messages comprising a geographic location identification, the alert messages including messages corresponding to both the text alert and the set of translated text alerts, via a standardized protocol to a mobile wireless service provider network;
   receiving, by a commercial mobile wireless service provider (CMSP) gateway, the alert messages from the alerting framework, including messages corresponding to both the text alert and the set of translated text alerts;
   forwarding, by the CMSP gateway, the alert messages via a mobile wireless technology-dependent interface of multiple mobile wireless technology-dependent interfaces supported by the CMSP gateway;
   receiving, by a commercial mobile wireless service provider (CMSP) infrastructure via the mobile wireless technology-dependent interface, the alert messages, including the geographic location identification; and
   forwarding, by the CMSP infrastructure, based on the geographic location identification, the alert messages including messages corresponding to both the text alert and the set of translated text alerts, for selectively broadcasting only by particular mobile wireless cell sites having a coverage area falling within a region corresponding to the geographic location identification,
   wherein the alert messages are thereafter presented on a receiving mobile device according to a specified default language and a prioritized list of languages facilitating selection of an alternative language if an alert message is not available in the specified default language.

2. The method of claim 1 wherein an interface of the CMSP gateway is independent of a network type, upon which CMSP infrastructure relies while forwarding the alert messages for broadcast via particular mobile wireless transmitters.

3. The method of claim 1 wherein the multiple wireless network technologies include CDMA2000.

4. The method of claim 1 wherein the database listing predominant foreign languages identified for each geocode is based upon US Census Bureau information relating to spoken languages of respondents residing within identified geographic areas.

5. The method of claim 1 wherein the text alert comprises a text string.

6. The method of claim 5 wherein the text string is an English text string.

7. The method of claim 1 wherein translating the text alert during the rendering step is performed by a third party translation service in response to a request, including the text alert and a list of target translation languages.

8. The method of claim 1 further comprising:
   designating, on a mobile wireless device, a preferred language for presenting alert message text.

9. A non-transitory computer readable medium including computer executable instructions for broadcasting public warning messages for presentation to mobile wireless device users in multiple languages, the computer-executable instructions facilitating performing, the steps:
   receiving, by an alerting framework, an alert message including:
      a geographic area identification, and
      a text alert;
   rendering, by the alerting framework, a set of translated text alerts for the text alert, the set of translated text alerts being in a set of foreign languages based upon designated foreign languages corresponding to the geographic area identification, wherein the set of foreign languages is determined by reference to a database listing predominant foreign languages identified for each geocode;
   issuing, by the alerting framework, alert messages comprising a geographic location identification, the alert messages including messages corresponding to both the text alert and the set of translated text alerts, via a standardized protocol to a mobile wireless service provider network;
   receiving, by a commercial mobile wireless service provider (CMSP) gateway, the alert messages from the alerting framework, including messages corresponding to both the text alert and the set of translated text alerts;
   forwarding, by the CMSP gateway, the alert messages via a mobile wireless technology-dependent interface of multiple mobile wireless technology-dependent interfaces supported by the CMSP gateway;
   receiving, by a commercial mobile wireless service provider (CMSP) infrastructure via the mobile wireless technology-dependent interface, the alert messages, including the geographic location identification; and
   forwarding, by the CMSP infrastructure, based on the geographic location identification, the alert messages including messages corresponding to both the text alert and the set of translated text alerts, for selectively broadcasting only by particular mobile wireless cell sites having a coverage area falling within a region corresponding to the geographic location identification, wherein the alert messages are thereafter presented on a receiving mobile device according to a specified default language and a prioritized list of languages facilitating selection of an alternative language if an alert message is not available in the specified default language.

10. The non-transitory computer readable medium of claim 9 further comprising instructions for designating, on a mobile wireless device, a preferred language for presenting alert message text.

11. An alert broadcast system comprising a non-transitory computer readable medium including computer executable instructions for issuing public warning messages to mobile wireless service providers in multiple languages, the alert broadcast system comprising:
   an alerting framework comprising:
      an alert message reception interface module for receiving an alert message including:
         a geographic area identification, and
         a text alert;
      a translation request interface module for obtaining a set of translated text alerts for the text alert, the set of translated text alerts being in a set of foreign languages based upon designated foreign languages corresponding to the geographic area identification, wherein the set of foreign languages is determined by reference to a database listing predominant foreign languages identified for each geocode; and
      a text alert issuance interface for issuing alert messages comprising a geographic location identification, the alert messages including messages corresponding to both the text alert and the set of translated text alerts, via a standardized protocol to a mobile wireless service provider network;
   a commercial mobile wireless service provider (CMSP) gateway, for receiving the alert messages from the text alert issuance interface, including messages corresponding to both the text alert and the set of translated text alerts, the CMSP gateway being further configured to forward the alert messages via a mobile wireless technology-dependent interface of multiple mobile wireless technology-dependent interfaces supported by the CMSP gateway; and
   a commercial mobile wireless service provider (CMSP) infrastructure configured for:
      receiving the alert messages, including the geographic location identification, via the mobile wireless technology-dependent interface, and
      forwarding, based on the geographic location identification, the alert messages including messages corresponding to both the text alert and the set of translated text alerts, for selectively broadcast only by particular mobile wireless cell sites having a coverage area falling within a region corresponding to the geographic location identification, and
   a mobile device configured to receive the alert messages transmitted by the mobile wireless cell sites and thereafter present at least one of the text alert and the set of translated text alert according to a specified default language and a prioritized list of languages stored on the mobile device facilitating selection of an alternative language if an alert message is not available in the specified default language.

* * * * *